(12) United States Patent
Zhou

(10) Patent No.: US 10,838,611 B1
(45) Date of Patent: Nov. 17, 2020

(54) NAVIGATION SYSTEM ON THE INFINITE SCROLL

(71) Applicant: Google LLC, Mountain View, CA (US)

(72) Inventor: Bailiang Zhou, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/402,731

(22) Filed: May 3, 2019

(51) Int. Cl.
*G06F 3/048* (2013.01)
*G06F 3/0485* (2013.01)
*G06F 3/0482* (2013.01)

(52) U.S. Cl.
CPC ........ *G06F 3/04855* (2013.01); *G06F 3/0482* (2013.01)

(58) Field of Classification Search
CPC ............................ G06F 3/04855; G06F 3/0482
USPC ......................................................... 715/739
See application file for complete search history.

(56) References Cited

U.S. PATENT DOCUMENTS

| | | | | |
|---|---|---|---|---|
| 9,652,140 | B2* | 5/2017 | Song | G06F 3/04855 |
| 10,437,423 | B2* | 10/2019 | Nguyen | G06F 16/26 |
| 2013/0091471 | A1* | 4/2013 | Gutt | G06F 16/54 |
| | | | | 715/848 |
| 2013/0263044 | A1* | 10/2013 | MacLaurin | G06F 3/04855 |
| | | | | 715/786 |
| 2014/0059482 | A1* | 2/2014 | Won | G06F 3/04855 |
| | | | | 715/787 |
| 2014/0129564 | A1* | 5/2014 | Kritt | G06F 16/168 |
| | | | | 707/741 |
| 2014/0208259 | A1* | 7/2014 | Desai | G06F 3/0485 |
| | | | | 715/784 |
| 2014/0215386 | A1* | 7/2014 | Song | G06F 3/04855 |
| | | | | 715/787 |
| 2015/0007108 | A1* | 1/2015 | Ozcelik | G06F 3/0482 |
| | | | | 715/810 |
| 2015/0149432 | A1* | 5/2015 | Hart | G06Q 40/00 |
| | | | | 707/708 |
| 2015/0242110 | A1* | 8/2015 | Balakrishnan | G06F 16/54 |
| | | | | 715/830 |
| 2017/0085854 | A1* | 3/2017 | Furesjo | G10L 15/265 |
| 2018/0115788 | A1* | 4/2018 | Burns | G06K 9/00718 |
| 2019/0108234 | A1* | 4/2019 | Torres | G06F 16/90324 |

OTHER PUBLICATIONS

Lee, Byungjoo, et al. "Spotlights: Attention-Optimised Highlights for Skim Reading" ACM Conference on Human Factors in Computing Systems, May 2016, 13 pages.

* cited by examiner

*Primary Examiner* — David Phantana-angkool
(74) *Attorney, Agent, or Firm* — Dority & Manning, PA

(57) ABSTRACT

Systems and methods for providing efficient navigation tools for an infinite scroll user interface are provided. One example method includes providing at least a portion of a set of content items, the set of content items including a plurality of previously displayed content items that have previously been displayed and one or more currently displayed content items. The method includes storing user engagement data for each content item. The method includes displaying a navigational tool that enables the user to access the plurality of previously displayed content items. The method includes automatically selecting previously displayed content items based on the user engagement data. The method includes presenting one or more content markers associated with the automatically selected one or more previously displayed content items.

19 Claims, 10 Drawing Sheets

NAVIGATION SYSTEM ON THE INFINITE SCROLL

FIELD

The present disclosure relates generally to content navigation systems. More particularly, the present disclosure relates to efficient navigation systems for an infinite scroll interface.

BACKGROUND

As computing devices and network bandwidth have increased, an increasing amount of content is delivered to users through their computing devices. One popular format for displaying content to a user is the infinite scroll user interface. The infinite scroll user interface presents a series of content items to a user and allows the user to scroll through the series of content items at their discretion. A remote server system is enabled to ensure that as the user scrolls past content items, new content items are downloaded and added to the series such that the series of content items appears to be infinite.

The infinite scroll user interface is particularly appropriate for long, undirected browsing sessions because it removes potential friction points such as having to click a "next page" icon and so on. However, because the user can view a nearly unlimited number of content items over a long browsing session, it can be difficult and/or time consuming to find a content item that was previously displayed to the user but has now been moved off-screen during the scrolling process.

SUMMARY

Aspects and advantages of embodiments of the present disclosure will be set forth in part in the following description, or can be learned from the description, or can be learned through practice of the embodiments.

One example aspect of the present disclosure is directed to a method for providing an efficient navigation system for an infinite scroll user interface. The method includes providing, by one or more computing devices, in a graphical user interface, at least a portion of a set of content items, the set of content items including a plurality of previously displayed content items that have previously been displayed and one or more currently displayed content items. The method includes storing, by the one or more computing devices, user engagement data for each content item in the plurality of previously displayed content items. The method includes displaying, by the one or more computing devices, in the graphical user interface, a navigational tool that enables the user to access the plurality of previously displayed content items. The method includes automatically selecting, by the one or more computing devices, one or more previously displayed content items from the plurality of previously displayed content items based on the user engagement data for at least one of the previously displayed content items in the plurality of previously displayed content items. The method includes presenting, by the one or more computing devices, in the graphical user interface and in association with the navigational tool, one or more content markers associated with the automatically selected one or more previously displayed content items.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
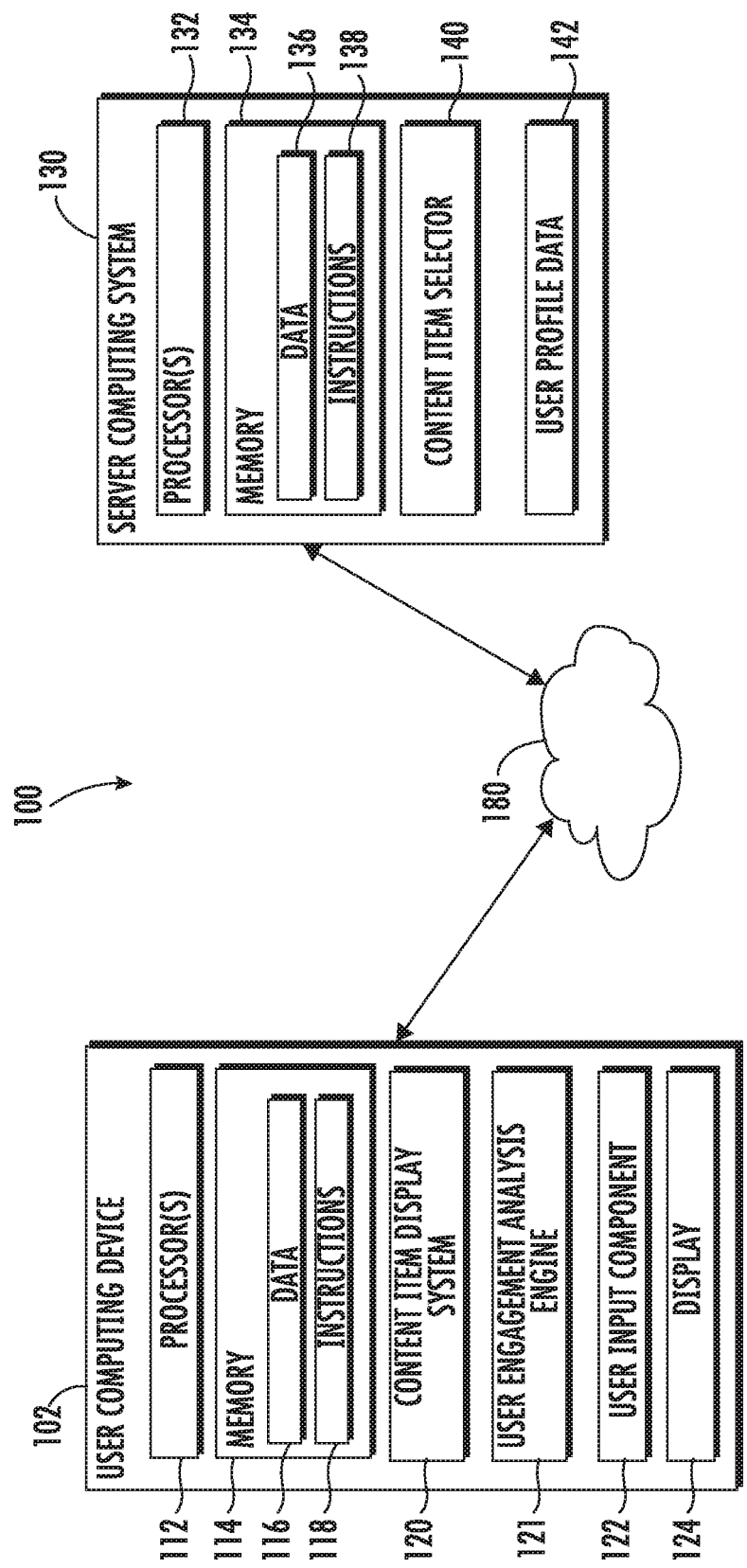
FIG. 1 depicts an example client-server environment according to example embodiments of the present disclosure.

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made to the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Generally, the present disclosure is directed to systems and methods that provide improved interfaces for navigating among content items. In particular, aspects of the present disclosure allow a user to more efficiently and intuitively return to or otherwise access content items that were previously displayed within an "infinite scroll" or similar user interface in which a user can continuously scroll or otherwise refresh the user interface to obtain additional content items. As one example, a computing device can provide a user interface that includes a navigational tool that enables the user to navigate to view previously displayed content items. According to an aspect of the present disclosure, the navigational tool can include or be presented in association with one or more content markers that are respectively associated with one or more previously displayed content items. The content markers can be intelligently designed and/or selected to enable a user to efficiently and intuitively return to certain content item(s) that the user has previously viewed. For example, content markers can be provided for content items that they user has indicated (e.g., through increased viewing time or other interactions) have elevated importance to or interest from the user. In such fashion, a user can use the content markers to quickly navigate to certain content items of interest, improving the ability of the user to interact with and input requests to the device. Consequently, the approach can both save user time and reduce the utilization of computing resources in rendering unnecessary content or interpreting more complex inputs.

More particularly, a set of content items can be displayed in a user interface of a device. In some example embodiments, the set of content items is ordered as a list. A user may scroll the content items in a first direction to move currently displayed content items out of the user interface (e.g., out of the top of the display) and move new content items into the user interface (e.g., up from the bottom of the display).

However, when a user reverses the scrolling direction (e.g., scrolling up instead of scrolling down), previously viewed content items can be moved back into the user interface for display. When the content items are scrolled backwards, a navigational tool may be displayed in a portion of the user interface. It should be noted, that, in some example embodiments, the navigational tool may also be displayed in the user interface without needing the content items to be scrolled backwards. A user may be able to interact with or respond to the navigational tool to access a set of previously presented content items. The set of previously presented content items can be ordered based on the order in which the previously presented content items were initially displayed. In this way, the most recently viewed content items are returned to the user interface first.

According to an aspect of the present disclosure, one or more content markers can also be presented in the user interface in association with the navigational tool. Each of the one or more content markers can be associated with at least one previously displayed content items. In some example embodiments, the previously displayed content items with which the displayed content markers are associated may be automatically selected based on based on one or more predetermined criteria. Such criteria may reflect an estimated user interest. A user may select a particular content marker and in response, the one or more previously viewed content items associated with the particular content marker are displayed.

More specifically, a user device may display a set of content items in a graphical user interface using an infinite scroll format. The total number of content items in the set of content items greatly exceeds the number that can be simultaneously displayed. An infinite scroll format allows a subset of content items in the set of content items to be displayed at a given time in the graphical user interface. In addition to the currently displayed content items, the set of content items can, in some instances, include a plurality of content items that have not yet been displayed. In some example embodiments, a server system can supply additional content items to display as needed.

When the device detects a first control input from the user, the graphical user interface can move the displayed content items in a first direction associated with the direction of the first control input. A control input is an input from a user that controls which content items are displayed. In some example embodiments, the first control input is a swipe input in a first direction. In response to the first control input, one or more of the currently displayed content items may be moved out of the graphical user interface (so they are no longer visible on the device) and content items that have not previously been displayed may be moved onto the graphical user interface.

As content items are moved out of the visible portion of the graphical user interface, the computer system can store a set of previously displayed content items in the order they were displayed. The computer system may then detect a second user control input indicating that the user wishes to view one or more previously displayed content items. For example, if a first user control input for scrolling forward through the list of content items is an upward swiping input, the second control input to scroll backwards through previously viewed content items may be a downward swiping input.

In response to detecting the second control input, the computer system can move the content items in a second direction opposite the first direction. The computer system can then begin moving previously displayed content items into the graphical user interface, beginning with the most recently displayed content item and continuing to display previously displayed content items in the reverse order that they originally appeared. If a user has been scrolling through the set of content items for a long period of time, the number of previously displayed items can be quite large. As such, it may be difficult and time-consuming to find a particular previously displayed content item by scrolling backwards.

In some example embodiments, to improve the user experience when attempting to find a previously viewed content item, the computer system may display a navigational tool on at least a portion of the display. In other example embodiments, the navigational tool is displayed while viewing content items in the set of content items without needing input to be displayed. In some example embodiments, the navigational tool can be a vertical bar. In some examples, the navigational tool is positioned such that it at least partially obscures one or more content items. In other examples, the navigational tool is positioned such that it does not obscure any content items.

In some example embodiments, the navigational tool is a visual representation of a plurality of previously displayed content items. For example, if the navigational tool is a vertical bar, the lower portions of the bar can represent more recently displayed content items and the upper portions of the bar can represent less recently displayed content items.

In some example embodiments, the navigational tool includes one or more content markers displayed near or on the navigational tool. A content marker may be associated with a specific previously viewed content item. If so, the content marker can be displayed near a portion of the navigational tool associated with the associated previously viewed content items. For example, if the navigational tool is a vertical bar and the lower part of the bar represents more recently viewed content items, the content markers associated with more recently displayed content items can be displayed lower than content markers associated with less recently displayed content items. In some example embodiments, a content marker may be associated with a group of content items or s specific time in the user's browsing history.

In some embodiments, the number of content items represented by the navigational tool may vary based on a variety of factors. For example, if a relatively small number of content items have been displayed in a particular browsing session, the navigational tool may represent all of them. As the number of previously displayed content items increases, the navigational tool may represent only a portion of the previously displayed content items. In some examples, if the user has been viewing content items for over an hour or across multiple sessions, only a portion (e.g., the last thirty minutes of content items) are represented by the navigational tool.

In another implementation, the density at which content items are represented may vary based on the number of previously displayed content items. Thus, the greater the number of previously displayed content items, the greater the density at which the previously displayed content items are represented by the navigational tool.

In another example, the navigational bar is configured to represent previously viewed content items at different densities or different time scales based at least in part on the speed at which a user is scrolling. For example, if a user is scrolling slowly through previously displayed content items, the navigational bar may represent a small number of recently displayed content items (e.g., under the assumption that user is looking for a relatively recently content item). However, if the user is scrolling quickly through previously viewed content items a larger number of content items are represented by the navigational tool (e.g., more items represented with a higher density).

In another implementation, the computer system stores information about each content item that is displayed in the user interface. In some example embodiments, this data is stored at the computer system itself (e.g., a smartphone, a tablet, or a personal computer). In other example embodiments, this data is stored at an associated server system (e.g., the server system that provided the content items). In yet other example embodiments, this data is partially stored on the computer system and partially stored on the server system.

The data stored for each content item may include a variety of types of data. For example, the computer system may store the order that each content item was displayed. By recording the order that the content items were displayed, the computer system can easily redisplay these content items in reverse order. In addition, the computer system can store data that describes, for each displayed content item, the length of time from the beginning of the scrolling session until the content item was displayed. In this way, the computer system captures data allowing the computer system to identify what content items were being displayed at specific time intervals relative to beginning of the scrolling session or the current time.

Similarly, the computer system may store data that describes when a specific content item was moved out of the graphical user interface and was therefore no longer visible. In addition, the computer system may store data that describes when a certain percentage of a content item is displayed or removed. In this way, content items that are only partially displayed may not be recorded as "displayed" and content items that are still partially visible may be recorded as "removed."

In addition, the computer system may store data associated with the length of time that a user viewed a particular content item. Thus, the content system can determine which items the user spent the most time viewing (e.g., reading, watching, or looking at). In addition, the computer system can record any other type of user engagement such as clicking, selecting, enlarging, shrinking, liking, disliking, tagging, or marking for later viewing. Indeed, the computer system may record any interaction the user has with a particular content item.

Further to the descriptions above, a user may be provided with controls allowing the user to make an election as to both if and when systems, programs, or features described herein may enable collection of user information (e.g., information about a user's engagement with one or more content items in a set of content items), and if the content markers are generated based on any collected user information.

In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

In some example embodiments, the computer system uses the stored content item data to determine what content markers to display and/or how they should be displayed. In some example embodiments, the navigational markers may represent a specific period of time. For example, a plurality of content markers is displayed adjacent to the navigational tool. Each content marker has an associated amount of time (e.g., a number of minutes or hours).

In some example embodiments, the plurality of content markers is presented at a location along the navigational tool based on the position of one or more associated content items associated with the respective content marker in the set of previously viewed content items. In other example embodiments, the one or more content markers are presented at locations along the navigational tool that are non-linear with respect to a respective elapsed time since viewing the previously displayed content items.

In this example, the content markers have labels reading "five minutes ago", "ten minutes ago", "twenty minutes ago", and "one hour ago". When the user selects a particular content marker, one or more previously viewed content items associated with the particular content marker may be displayed. In some examples, the list of content items is scrolled backward to display the content items that were displayed at the time indicated. In other examples, the user interface displays the one or more content items without any scrolling.

As noted above, the stored content item data can include time data that the computer system can use to identify the content items that were displayed at the selected time. Thus, when the user selects the twenty-minute content marker, the user interface automatically scrolls backward to display the content item(s) that were displayed twenty minutes before.

In other example embodiments, the displayed content markers are selected by automatically identifying one or more content items with which the user has spent the most time. For example, the computer system can select the four content items that have the longest user interaction time (e.g., the total time it was displayed in the graphical user interface) or the most significant user interaction (e.g., liking, clicking, favoriting and so on). Thus, when a user scrolls backwards, the navigational tool may include content markers for the content items that are determined to be of highest interest to the user.

In some example embodiments, when a content marker represents a particular content item, the content marker may include a snippet of a title, a thumbnail of an image associated with the content item, and/or some other summary or portion of the content item. In this way, the user can quickly identify and select the content marker associated with a content item the user wishes to view. Upon selection of a particular content item, the computer system may scroll the displayed content items to display the content item associated with the selected content marker. In other example embodiments, the computer system may display the content item associated with the selected content marker without displaying a scrolling animation. In some example embodiments, if the user hovers over or otherwise interacts with a content marker, a larger, more detailed version of the corresponding content item can be displayed (e.g., in a larger pop-out window or affordance).

In another implementation, the content markers may be associated with a percentage indicator, the percentage indicator associated with the percentage of previously viewed content items that are before or after the marker. For example, a given navigational marker has a 25% notifier on it. When selected, the navigational marker can move to the twenty-fifth percentile of content items (e.g., either by time or by the number of content items). In some example embodiments, the content markers may use a mix of the above visualization techniques to provide the best user experience.

The systems and methods described herein provide a number of technical effects and benefits. In particular, the present disclosure allows significant improvement in the graphical user interfaces commonly used to display content to users. Traditionally, content delivery systems provide very limited means for finding content items in an infinite scroll format once those content items have been scrolled off-screen. Often, the only method for finding previously viewed content items is to scroll backwards through the order set manually. Doing so is time and resource intensive.

By providing content markers on the display, the present disclosure allows users to save significant time and effort. This time savings has the technical effect of reducing total power consumption by any device displaying content in an infinite scroll. Similar reductions in bandwidth usage, processor usage, and memory usage may also result from the increased efficiency of the system disclosed herein. In addition, content markers can allow a user to immediately jump to a desired content item and thus avoid the need to re-download or re-display any unwanted, intermediate content items from a remote server system. This can result in reduced bandwidth usage, reduced use of processor to displayed unwanted content items.

With reference now to the Figures, example embodiments of the present disclosure will be discussed in further detail.

Example Devices and Systems

FIG. 1 depicts an example client-server environment 100 according to example embodiments of the present disclosure. The client server environment 100 includes a user computing device 102 and a server computing system 130 that are connected by and communicate through a network 180. Although a single user computing device 102 is depicted, any number of user computing devices 102 can be included in the client-server environment 100 and connect to server computing system 130 over a network 180.

In some example embodiments, the user computing device 102 can be any suitable device for displaying content to a user, including, but not limited to, a smartphone, a tablet, a laptop, a desktop computer, a PDA, a gaming console, a wearable computing device, or any other device that is configured such that it can display content items to a user. The user computing device 102 can include one or more processor(s) 112, memory 114, a content item display system 120, a user engagement analysis engine 121, a user input component 122, and a display 124.

The one or more processor(s) 112 can be any suitable processing device, such as a microprocessor, microcontroller, integrated circuit, or other suitable processing device. The memory 114 can include any suitable computing system or media, including, but not limited to, non-transitory computer-readable media, RAM, ROM, hard drives, flash drives, or other memory devices. The memory 114 can store information accessible by the one or more processor(s) 112, including instructions that can be executed by the one or more processor(s) 112. The instructions can be any set of instructions that when executed by the one or more processor(s) 112, cause the one or more processor(s) 112 to provide desired functionality.

In particular, in some devices, memory 114 can store instructions for implementing a content item display system 120 and a user engagement analysis engine 121. The user computing device 102 can implement the content item display system 120 and user engagement analysis engine 121 to execute aspects of the present disclosure, including directing communications with server computing system 130 and providing an infinite scroll interface to a user (e.g., presenting one or more content items and navigational tools in a user interface).

It will be appreciated that the terms "system" or "engine" can refer to specialized hardware, computer logic that executes on a more general processor, or some combination thereof. Thus, a system or engine can be implemented in hardware, application specific circuits, firmware and/or software controlling a general-purpose processor. In one embodiment, the systems are implemented as program code files stored on the storage device, loaded into memory and executed by a processor or can be provided from computer program products, for example computer executable instructions, that are stored in a tangible computer-readable storage medium such as RAM, hard disk or optical or magnetic media.

Memory 114 can also include data 116, such as content item data, that can be retrieved, manipulated, created, or stored by the one or more processor(s) 112. In some example embodiments, such data can be accessed and used to generate content items and display the content items to a user. Memory 114 may also include user engagement data for a plurality of content items. User engagement data for a particular content item includes information describing the time spent viewing the content item, any user interaction with the content item (such as liking, upvoting, downvoting, sharing, and so on), and whether the user clicked on the content items (e.g., clicked through to read an article, view an image or post, played a video or audio file, and so on). In some example embodiments, the memory 114 may also include user engagement scores for each content item generated by the user engagement analysis engine 121.

In some example embodiments, a content item display system 120 can display one or more content items from a set of content items received from a server computing system 130. In some implementations, the content item display system 120 can be included in an application (e.g., a mobile application, a browser application, or other application) with which the content items are associated. In other implementations, the content item display system 120 can be separate from but interoperate with an application with which the content items are associated. The set of content items can be stored as data 116 in memory 114. In some example embodiments, the number of content items displayed at a given time can be determined based on the size of the display 124, the size of the content items, and the preferences of a user. In some example embodiments, the set of content items is ordered (e.g., the set of content items is an ordered list). The content items can be ordered based on a plurality of criteria, including, but not limited to, the original publication date of the content item, one or more popularity metrics generated based on feedback gathered from other users, an expected user interest based on pre-determined user preferences, or any other ordering metric.

The content item display system 120 can interoperate with the display 124 to display the set of content items in an infinite scroll user interface. As noted above, an infinite scroll user interface can be designed to display one or content items from a set of content items at a time. Then, in response to user input, the one or more content items are moved in a first direction on the screen (e.g., scrolled upward) until the content items reach the edge of the display 124 (or area of the display 124 dedicated to the user interface). Once a currently displayed content item reaches the edge of the display 124, the currently displayed content items are moved off the display in the first direction. For example, if the user input is an upward scrolling motion, the currently displayed content items may be moved upward until they reach the edge of the display 124. Once a content item reaches the edge of the display, the content item will continue to move upwards, with the portions of the content item that are above the display 124 being removed from view until the entire content item is no longer displayed.

In some example embodiments, while currently displayed content items are moved off of the display in response to user input, the content item display system 120 moves content items that were not previously displayed into the display 124. For example, while currently displayed content items are being moved upwards and off the display, the content item display system 120 can cause new content items to move onto the display 124 from the bottom and continue to move upwards until the entire content item is displayed. In this way, a user can continue to scroll through the set of content items and as currently displayed content items are moved out of the display area, new content items will continuously be moved onto the display 124.

If the user has viewed all the content items already received from the server computing system 130, the user computing device 102 may automatically request additional content items from the server computing system 130. In another example embodiment, the user computing device 102 may continuously and automatically receive new content items from the server computing system 130 to avoid any interruption in the display of new content items.

In some example embodiments, the content item display system 120 stores records of previously viewed content items. For example, as each content item is displayed and then moved out of the display, the content item display system 120 may record and store information about that content item and the order it was displayed in. In this way, if the user computing device 102 receives user input, via the user input component 122, that causes the content items to scroll in a second direction (e.g., downwards instead of upwards) the previously viewed content items can be moved back onto the display in the order in which it was originally displayed.

In some example embodiments, the content item display system 120 may also provide a navigational tool to allow a user to easily and quickly access previously viewed content items. In some example embodiments, the navigational tool is displayed whenever the infinite scroll interface is displayed. In other example embodiments, the navigational tool is displayed in response to a user input. For example, if a user has been scrolling upwards to view new content items and then the user scrolls downwards, the content item display system 120 may begin scrolling previously viewed content items back into the display 124 and display the navigational tool.

In some example embodiments, the navigational tool represents a plurality of previously displayed contest items. For example, the navigational tool maybe a vertical bar with the bottom of the bar representing more recently displayed content items and the top of the bar representing less recently displayed content items. In other example embodiments, the navigational tool may represent the previously displayed content items in an order that is chronological. For example, the navigational tool can represent previously viewed content items based on the amount of time each content item was displayed, such that content items that were displayed the longest would be represented at the top of the navigational tool and the content items that were displayed the shortest (e.g., content items that were quickly scrolled past).

In some example embodiments, the content item display system 120 automatically selects one or more previously displayed content items based on user engagement data for each of the previously displayed content items. The user engagement data can be recorded by the user engagement analysis engine 121 and is discussed in more detail below. In some example embodiments, the content item display system 120 presents one or more content markers in the user interface associated with the navigational tool.

In some example embodiments, one or more content markers are displayed near or on the navigational tool. For example, the content markers may be displayed next to a particular section of the navigational tool. In other examples, the content markers are depicted as a point on the navigational tool, wherein the point represents a particular previously viewed content item. The content markers maybe icons or visual indicators associated with one or more particular previously viewed content items. In other example embodiments, the content markers are associated with a particular time in a browsing history or a percentage of the previously viewed content items.

In some example embodiments the content markers are selectable. When a particular content item is selected, the content item display system 120 may display the content item or group of content items associated with the selected content marker. In some cases, the content item display system 120 may visually jump directly to the associated content item(s) so that no intervening content items are scrolled past. In other cases, content item display system 120 may visually scroll the list of previously displayed content items until it reaches the content item or group of content items associated with the selected content marker.

In other examples, the content item display system 120 may generate content markers that are associated with a particular time in the user's content item browsing history. For example, content markers can be associated with a specific time such as "three minutes ago," "five minutes ago," "twenty minutes ago," and so on.

In some example embodiments, a content marker may include a text label displayed near a portion of the navigational tool. The text label of the content marker may include information that is associated with one or more content markers. In addition, the content marker can be displayed such that the relative position of the content markers on the navigational tool indicates the relative position on the associated content items in the list previously viewed content items. For example, a content marker associated with a more recent period of time (or a content item displayed more recently) will be displayed closer to the bottom of the navigational tool than a content marker associated with less recent period of time (or a content item displayed less recently).

In other example embodiments, a content marker includes at least a portion of the content included in the associated content items. For example, the content marker may include a snippet of an article or a thumbnail of an image that were included in a content item associated with the content marker.

The user engagement analysis engine 121 can store or record user engagement information concerning the user engagement with particular content items. For example, the user engagement analysis engine 121 may generate and store data that indicates the amount of time the user views a particular content item. Other data that may be used to measure user engagement may include user clicks, likes, shares, upvotes, downvotes, and/or various other interactions with the content by the user. In addition, the user engagement analysis engine 121 may record interactions such as playing a video, reading an article, listening to an audio content item, and so on. In some implementations, the user engagement analysis engine 121 can be included in an application (e.g., a mobile application, a browser application, or other application) with which the content items are associated. In other implementations, the user engagement analysis engine 121 can be separate from but interoperate with an application with which the content items are associated.

The user engagement analysis engine 121 can use data associated with user engagement to generate a user engagement score for each previously viewed content item. For example, a user engagement score for a particular content item can increase based on the length of time that the particular content item was displayed to the user. Similarly, the more positive-associated actions associated with a content item (e.g., liking, sharing, up-voting, etc.) the higher the user engagement score is likely to be. As one example, in some implementations, the user engagement analysis engine 121 can include and employ one or more machine-learned models (e.g., artificial neural networks) to generate the user engagement scores for the content items. For example, the machine-learned model(s) can be trained according to a supervised training scheme in which content item training examples are paired with ground truth scores (which may also be referred to as labels). As another example, in some implementations, the user engagement analysis engine 121 can apply an engagement scoring function to generate the user engagement score for a content item. In one example, the engagement scoring function can apply respective weights to different types of user engagement data to produce the score. In some implementations, the respective weights of the engagement scoring function can be machine-learned based on historical user engagement data. The scores can be or include numerical scores, textual scores (e.g., categorization of the content item), cluster assignments, other types of scores, or combinations thereof.

In some example embodiments, the user input component 122 includes one or more methods of receiving user input from the user to the user computing device 102. For example, the user input component may include one or more of: a touch screen, a mouse, a keyboard, a microphone, or any other input device. In some example embodiments, the display 124 may include any device capable of displaying visual information to user.

In accordance with some example embodiments, the server computing system 130 can include one or more processor(s) 132, memory 134, a content item selector 140, and user profile data 142. The memory 134 can store information accessible by the one or more processor(s) 132, including instructions 138 that can be executed by processor(s) and data 136.

The server computing system 130 can include or be in communication with one or more user computing device(s) 102 using a network communication device that is not pictured. The content item selector 140 can select, from database of content items, a set of content items to transmit to a user computing device 102. In some example embodiments, the content item selector 140 may select content items based on a variety of criteria including, but not limited to, recency of publication, overall popularity, or the degree to which the content item matches the implicit or explicitly interests of a user associated with the user computing device 102.

The user profile data 142 can include demographic information about a plurality of users, a user interest profile for each user, and past user engagement data received from a user computing device 102.

The network 180 can be any type of communications network, such as a local area network (e.g. intranet), wide area network (e.g. Internet), or some combination thereof. In general, communication between the user computing device 102 and the server computing system 130 can be carried via network interface using any type of wired and/or wireless connection, using a variety of communication protocols (e.g. TCP/IP, HTTP), encodings or formats (e.g. HTML, XML), and/or protection schemes (e.g. VPN, secure HTTP, SSL).

Figure 2A:
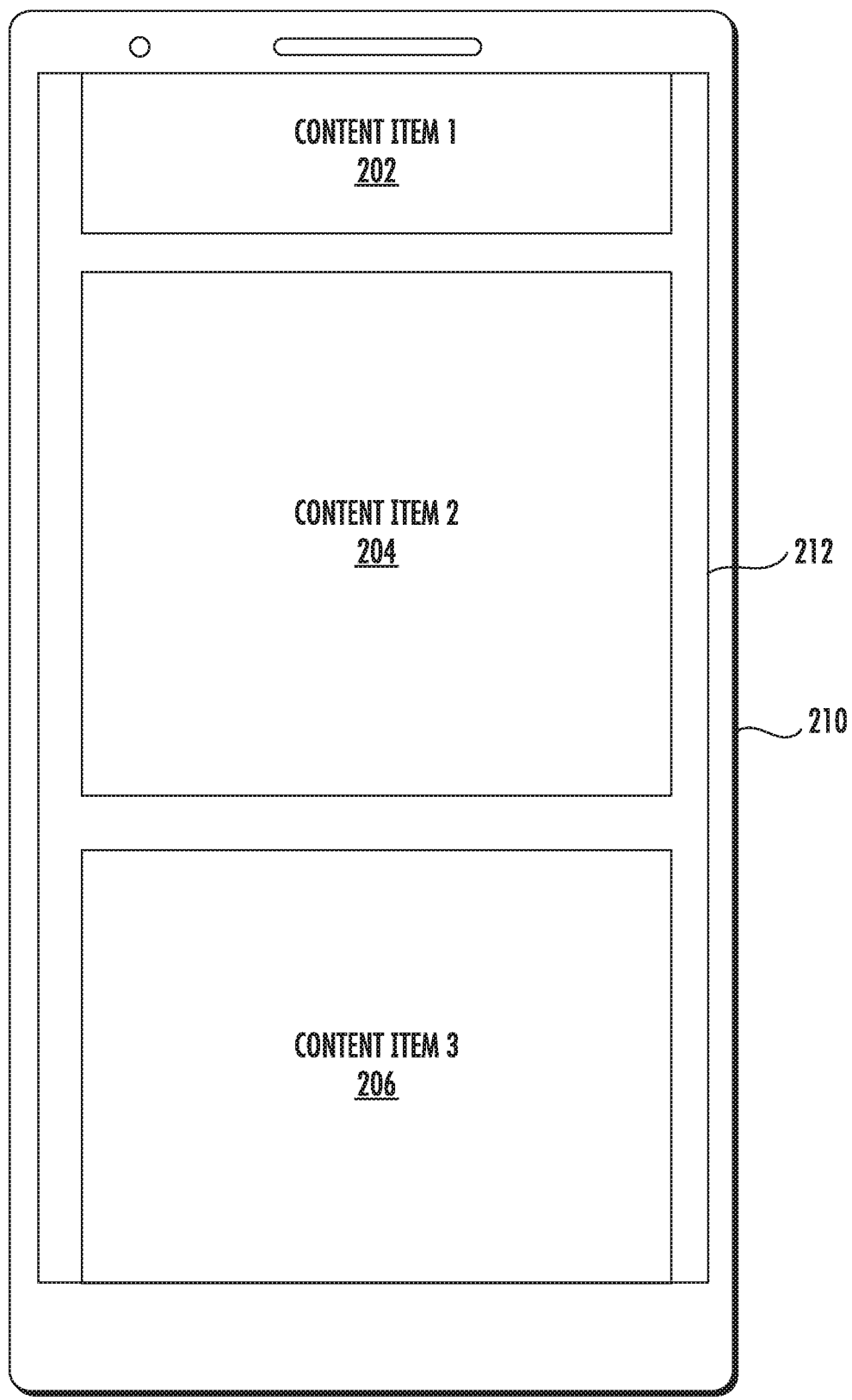
FIGS. 2A-2H depict example user interfaces according to example embodiments of the present disclosure.

FIG. 2A depicts an example user interface according to example embodiments of the present disclosure. In this example, a computing device 210 includes a display 212. Although the depicted computing device 210 is a smartphone or tablet, the computing device 210 can be any one of: a smartphone, a tablet, a laptop, a desktop computer, a PDA, a wearable computing device, or any other device that is configured such that it can display content items to a user. Also, note that the computing device 210 can serve as the user computing device 102 as seen in FIG. 1.

In this example, the display 212 includes an infinite scroll user interface. An infinite scroll user interface can display one or more content items. In this specific, example three content items are at least partially displayed: content item 1 202, content item 2 204, and content item 3 206.

As seen in this example, content item 2 204 is fully visible, content item 1 202 is partially visible with the upper section being above the display 212 and thus outside of the displayed portion of the user interface. Similarly, at least a portion of the bottom section of content item 3 206 is below the edge of the display and thus not presented in the infinite scroll user interface.

Figure 2B:
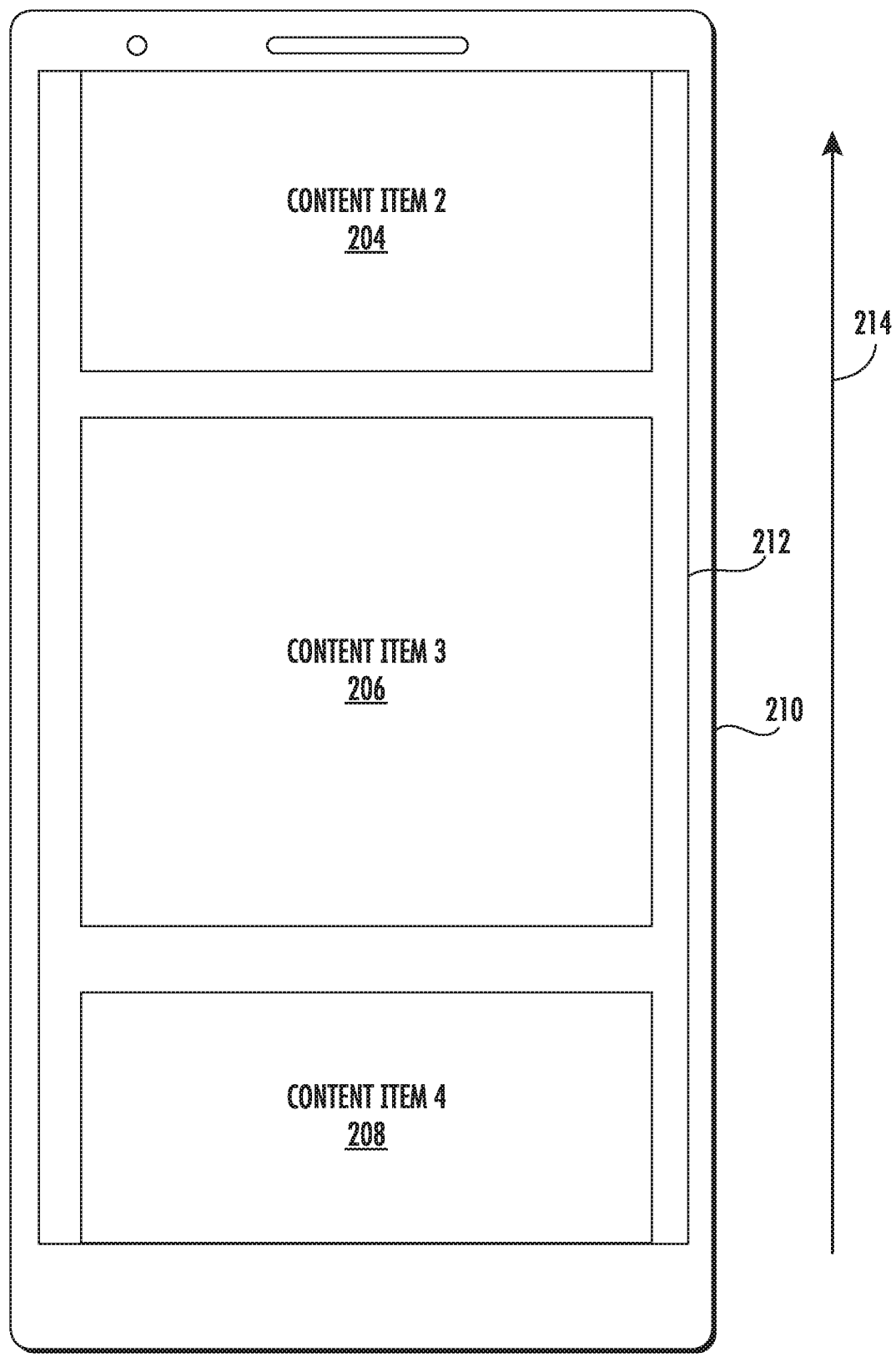

FIG. 2B depicts an example user interface according to example embodiments of the present disclosure. This example represents a continuation of the example user interface from FIG. 2A. As above, FIG. 2B depicts a computing device 210 with a display 212. In this example, the content items have been moved in response to a user input. In this case, the user input caused the items to move upwards (as represented by the upwards pointing arrow 214).

In response to the user input the content items were shifted upwards and as such, content item 1 202 is no longer visible and has been moved entirely out of the display 212 of the computing device 210. Content item 2 204 has been moved upwards, such that it is now partially off-screen. Content item 3 206 has also been moved upwards, becoming fully visible on the display. In addition, a new content item, content item 4 208 has been moved onto the display 212 as is partially visible (with a lower portion being below the edge of the display.) In this way, new content items can be added to the display as currently displayed content items are moved off the display.

Figure 2C:
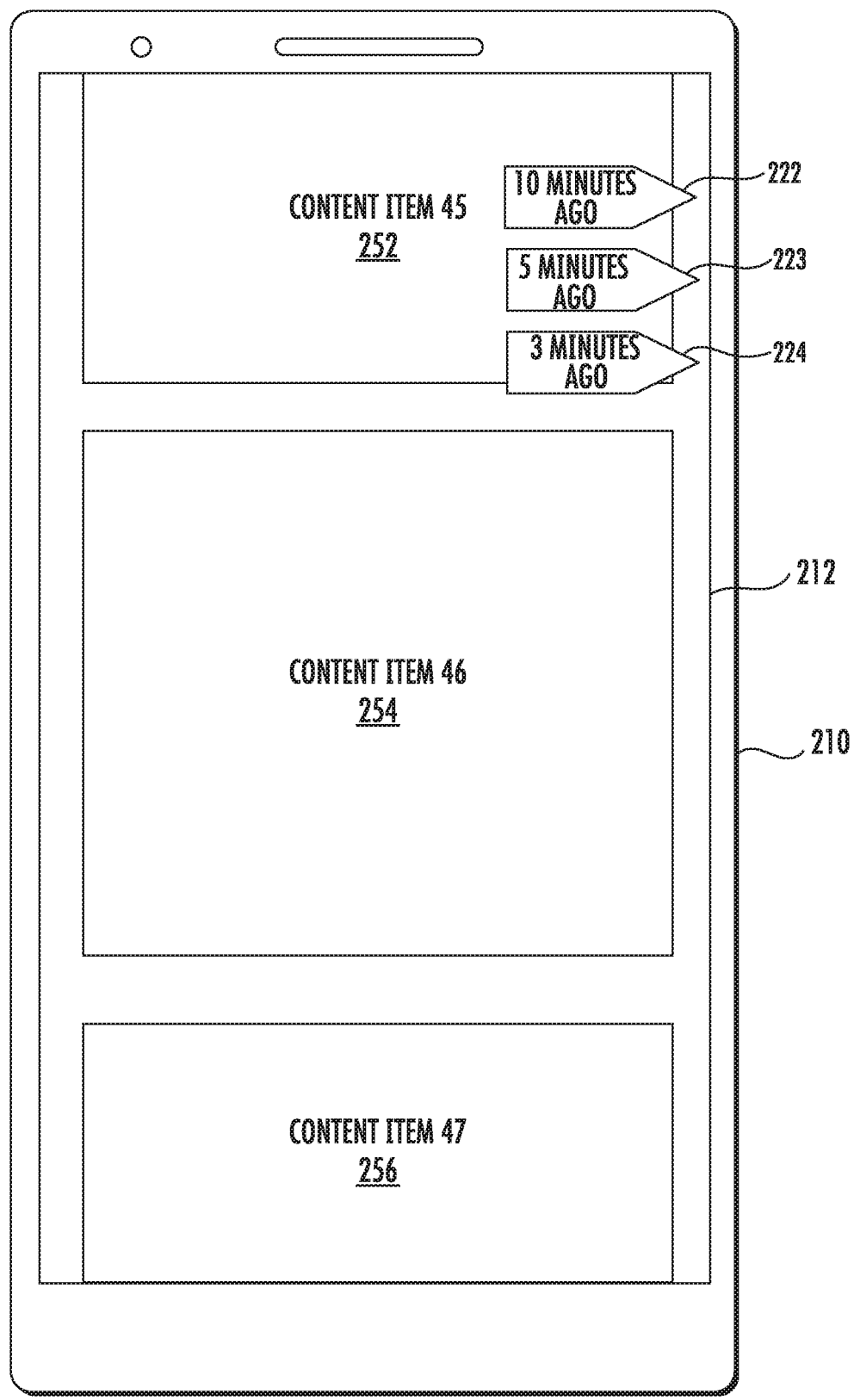

FIG. 2C depicts an example user interface according to example embodiments of the present disclosure. In this example, a computing device 210 with a display 212 displays a user interface with a plurality of content items (content item 45 252, content item 46 254, and content item 47 256) and a plurality of content markers (222, 223, and 224). The content markers (222-224) include labels representing a particular time in the browsing history of user. Thus, the content marker 222 includes the label "10 MINUTES AGO," the content marker 223 includes the label "5 MINUTES AGO", and the content marker 224 includes the label "3 MINUTES AGO."

When a user clicks on (or otherwise selects) a particular content marker, the user interface will be updated to display the content items that were displayed to the user during the time frame indicated by the label. For example, if the user selects the second content marker 223 which has the label "5 MINUTES AGO," the display can be updated to include the content items that were displayed in the user interface at a point five minutes in the past. The computing device 210 stores a browsing history for the current browsing session of the infinite scroll (and potentially past browsing sessions).

Thus, when the second content marker 223 is selected, the computing device identifies the content items that were displayed at that time and updates the display 212 to include those content items. In should be noted that this example does not include an explicitly displayed navigational tool and the content markers are displayed near the right side of the display 212, which acts as an implicit navigational tool.

Figure 2D:
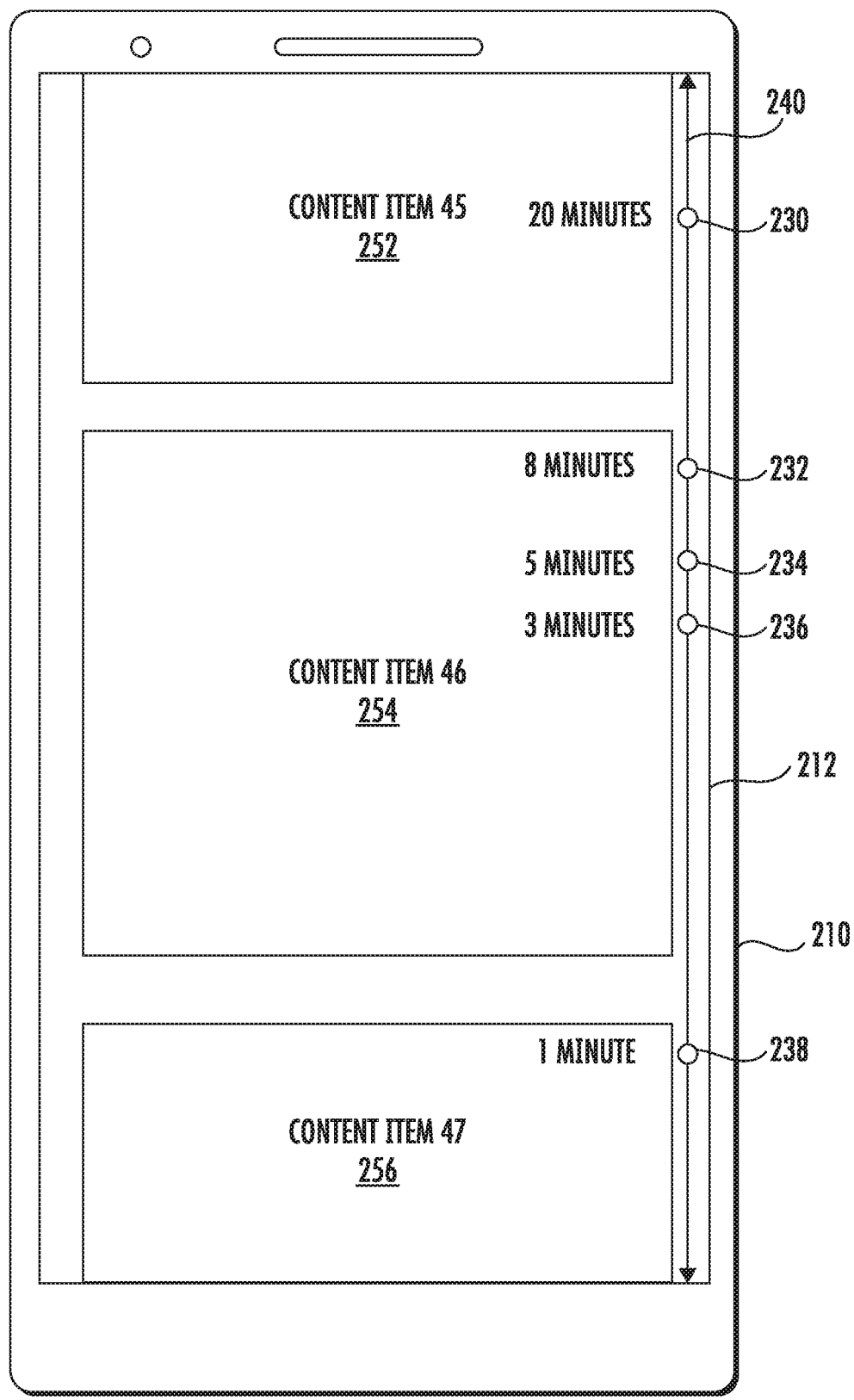

FIG. 2D depicts an example user interface according to example embodiments of the present disclosure. In this example, a computing device 210 with a display 212 displays a user interface with a plurality of content items (content item 45 252, content item 46 254, and content item 47 256), a navigational tool 240, and a plurality of content markers (230, 232, 234, 236, and 238). The content markers (230-238) include an indicator on the navigational tool 240 and an accompanying label. As above, selecting either the indicator (e.g., one of the white dots on the navigational tool) or the label of a content marker, will cause the user interface to display the content items associated with the time indicated in the labels.

For example, content marker 230 includes the label "20 MINUTES," content marker 232 includes the label "8 MINUTES," content marker 234 includes the label "5 MINUTES," content marker 236 includes the label "3 MINUTES," and content marker 238 includes the label "1 MINUTE." When a user selects content marker 236 the user interface of the display 212 can update to include the content items that were displayed 3 minutes ago.

As can be seen in this example, the content markers can be ordered chronologically, such that more recent time periods are displayed lower on the navigational tool and less recent time periods are displayed higher. In other examples, the content markers can be displayed in a non-chronological order. In addition, in this example, the content markers not required to be linear spaced based on relative time difference. Thus, the distance on the navigational tool between content marker 236 and content marker 238 (which have a difference of 2 minutes) is greater than the distance between content marker 230 and content marker 232 (which have a difference of 12 minutes). Instead, these content markers can be spaced based on the number of content items viewed during those times, the interest the user displayed during those times, or for a plurality of other criteria.

Figure 2E:
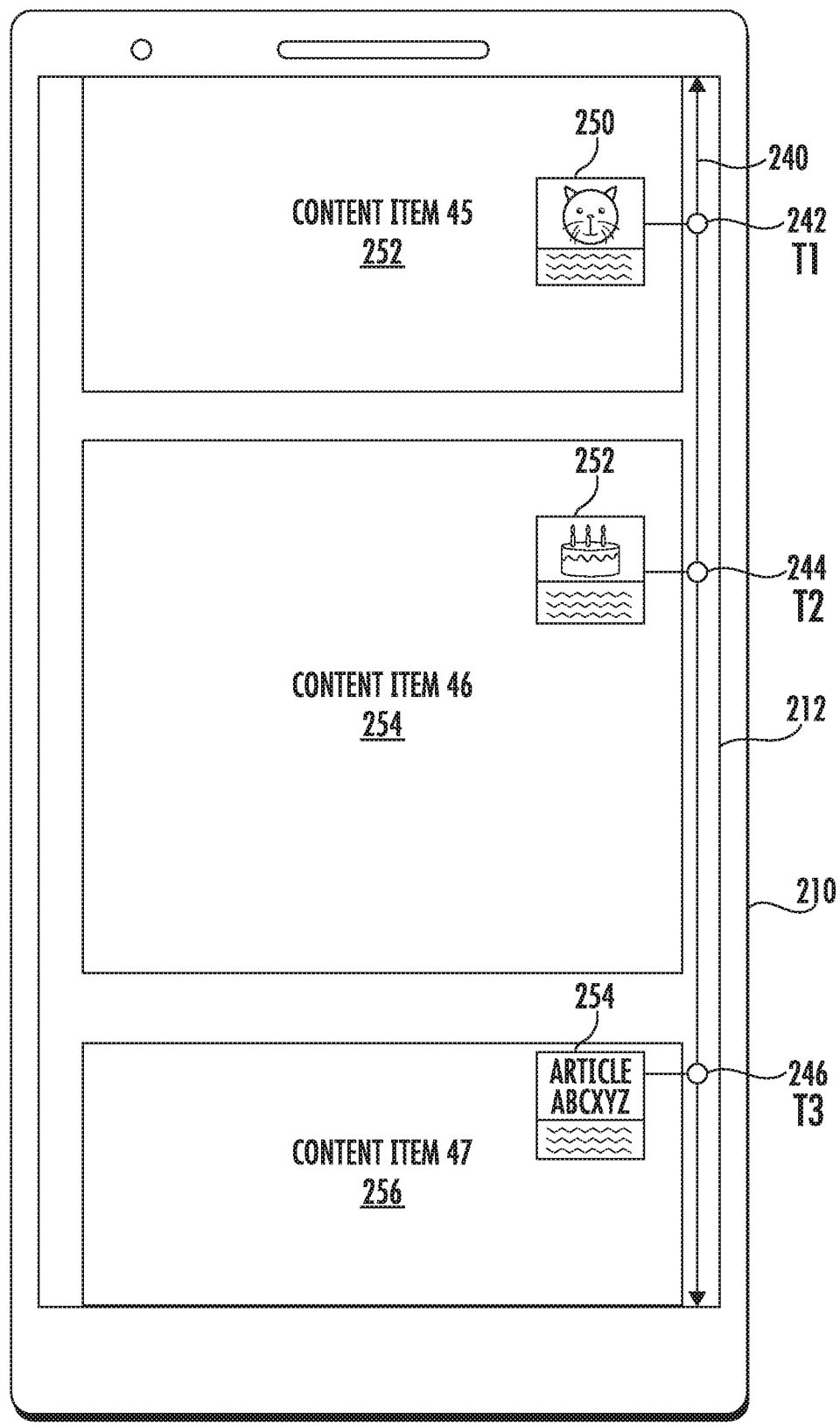

FIG. 2E depicts an example user interface according to example embodiments of the present disclosure. In this example, a computing device 210 with a display 212 displays a user interface with a plurality of content items (content item 45 252, content item 46 254, and content item 47 256), a navigational tool 240, and a plurality of content markers (242, 244, and 246). In this example, the content markers (242-246) include an indicator on the navigational tool 240 and an accompanying icon (250, 252, and 254). In this example, the accompanying icon includes a snippet of text, an image or thumbnail from the content item, or an icon representing the specific content of the associated content item(s).

In this example, content marker 242 has an accompanying icon 252 that is an image of a cat. In some examples, the cat image in the accompanying icon 252 may be a thumbnail of an image in a content item or a section of an image in the content item. Similarly, content marker 244 has an accompanying icon 254 that is an image of a birthday cake. This image may be a thumbnail of an image in the associated content item. In another example, the image in the accompanying icon 254 may represent that the associated content item(s) are associated with a particular birthday or with birthdays generally. The content marker 246 has an accompanying icon 256 that includes a text snippet from an article. As above, selecting either the indicator (e.g., one of the white dots on the navigational tool) or the accompanying icon of the content marker, will cause the user interface to display the content item(s) associated with the content marker.

In addition, in this example, each content marker is associated with a particular time stamp. Content marker 242 is associate with timestamp T1, content marker 244 is associated with timestamp T2, and content marker 246 is associated with timestamp T3. In this example, the content markers are ordered chronologically, such that the content marker with the most recent timestamp (e.g., content marker 246 with timestamp T3) is displayed near the bottom and the content marker with the least recent timestamp (e.g., content marker 242 with timestamp T1) is displayed furthest from the bottom.

Figure 2F:
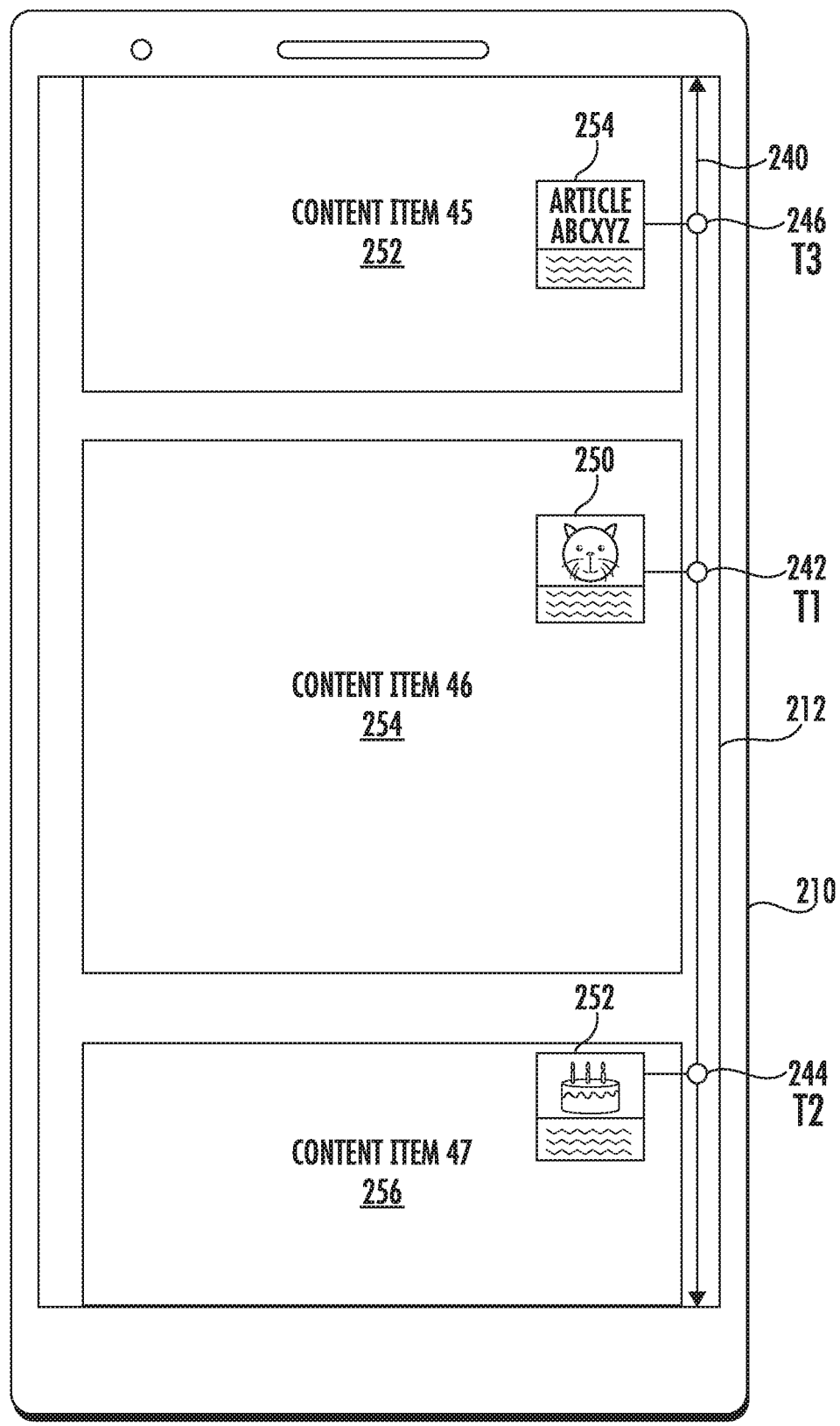

FIG. 2F depicts an example user interface according to example embodiments of the present disclosure. The example continues with the example in FIG. 2E and includes a computing device 210 with a display 212 that displays a user interface with a plurality of content items (content item 45 252, content item 46 254, and content item 47 256), a navigational tool 240, and a plurality of content markers (242, 244, and 246). In this example however, the content markers are not represented chronologically. Instead, the content items can be grouped by content type, with articles being grouped near the top. As such, content marker 246 can be displayed being near the top of the navigational tool 240. Further, in this example, images and memes can displayed in the middle. Thus, content marker 242 can be displayed near the middle of the navigational tool 240. Further, in this example, social media posts and updates can be displayed at the bottom. Thus, content marker 244 can be displayed near the bottom of the navigational tool 240.

In other examples, the non-chronologically displayed content markers can be sorted/ordered based on criteria other than content type. For example, the content markers can be ordered according to the respective content engagement scores associated with the corresponding content items. For example, the content marker for a top-scoring content item can be displayed at the top, followed by the second top-scoring, and so on, regardless of the chronological or scrolling order in which the content items were presented.

Figure 2G:
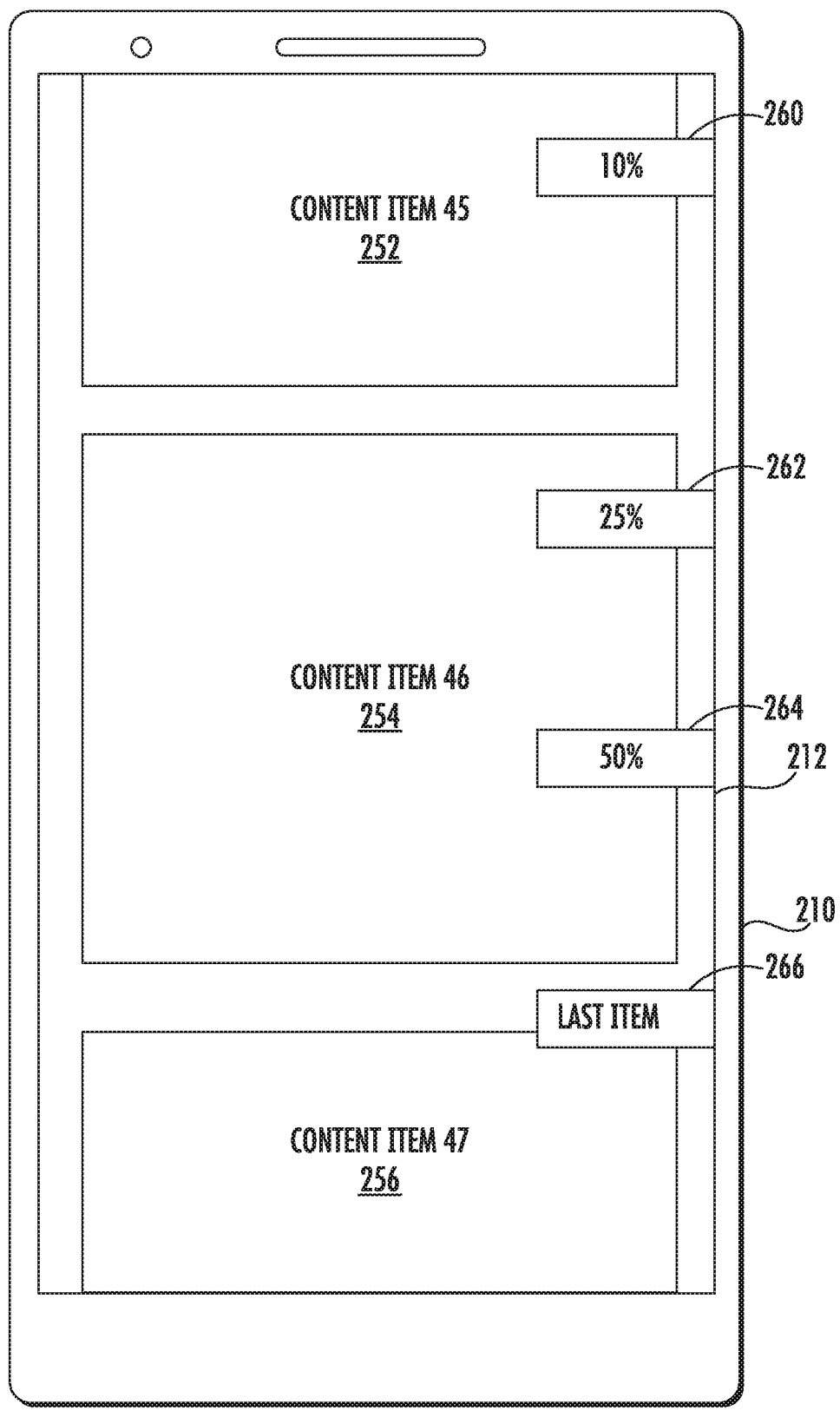

FIG. 2G depicts an example user interface according to example embodiments of the present disclosure. In this example, a computing device 210 with a display 212 displays a user interface with a plurality of content items (content item 45 252, content item 46 254, and content item 47 256), a navigational tool 240, and a plurality of content markers (260, 262, 264, and 266). In this example, the content markers (260-266) include a label indicating a percentage value, the percentage value representing the percentage of content items between content items associated with the content marker and the beginning of the list.

In this example, content marker 260 has a label reading "10%" which indicates the associated content item is approximately 10% through the list of previously displayed content items. Content marker 262 and content marker 264 have labels reading "25%" and "50%" respectively, each label representing the percentage of previously content items above the content item associated with the respective content marker. Content marker 4 266 has a label reading "LAST ITEM" and is associated with the most recent previously displayed content item to be removed from the display 212. As above, selecting either the indicator (e.g., one of the white dots on the navigational tool) or the label of the content marker, will cause the user interface to display the content item(s) associated with the selected content marker.

Figure 2H:
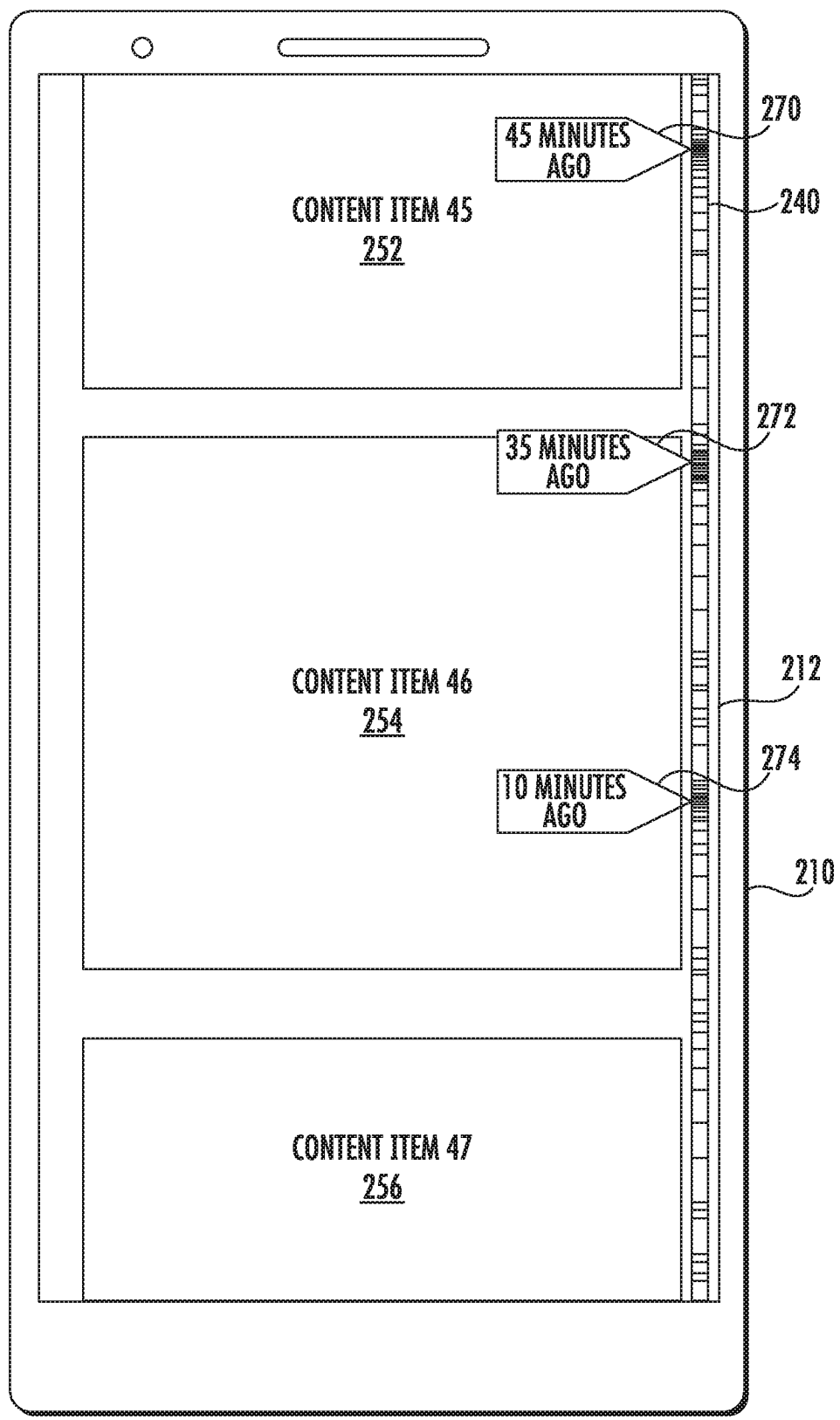

FIG. 2H depicts an example user interface according to example embodiments of the present disclosure. In this example, a computing device 210 with a display 212 displays a user interface with a plurality of content items (content item 45 252, content item 46 254, and content item 47 256), a navigational tool 240, and a plurality of content markers (270, 272, and 274). In this example, the content markers (270-274) include a label indicating a time in the user's past browsing history.

In this example, content marker 270 has a label reading "45 MINUTES AGO," content marker 272 has a label reading "35 MINUTES AGO," and content marker 274 has a label reading "10 MINUTES AGO." The navigational tool 240 itself represents the amount of time spent with particular sections of the browsing history. Specifically, the navigational tool includes a varying amount and/or density of shading, wherein the darker parts of the navigational tool 240 represent where the content items are displayed for a longer amount of time. Lighter sections represent the content items that are displayed for a shorter amount of time. Thus, the user can visually identify which sections of the browsing history were displayed for the longest times.

As above, selecting the label of content marker will cause the user interface to display the content item(s) associated with the selected content marker.

Example Methods

Figure 3:
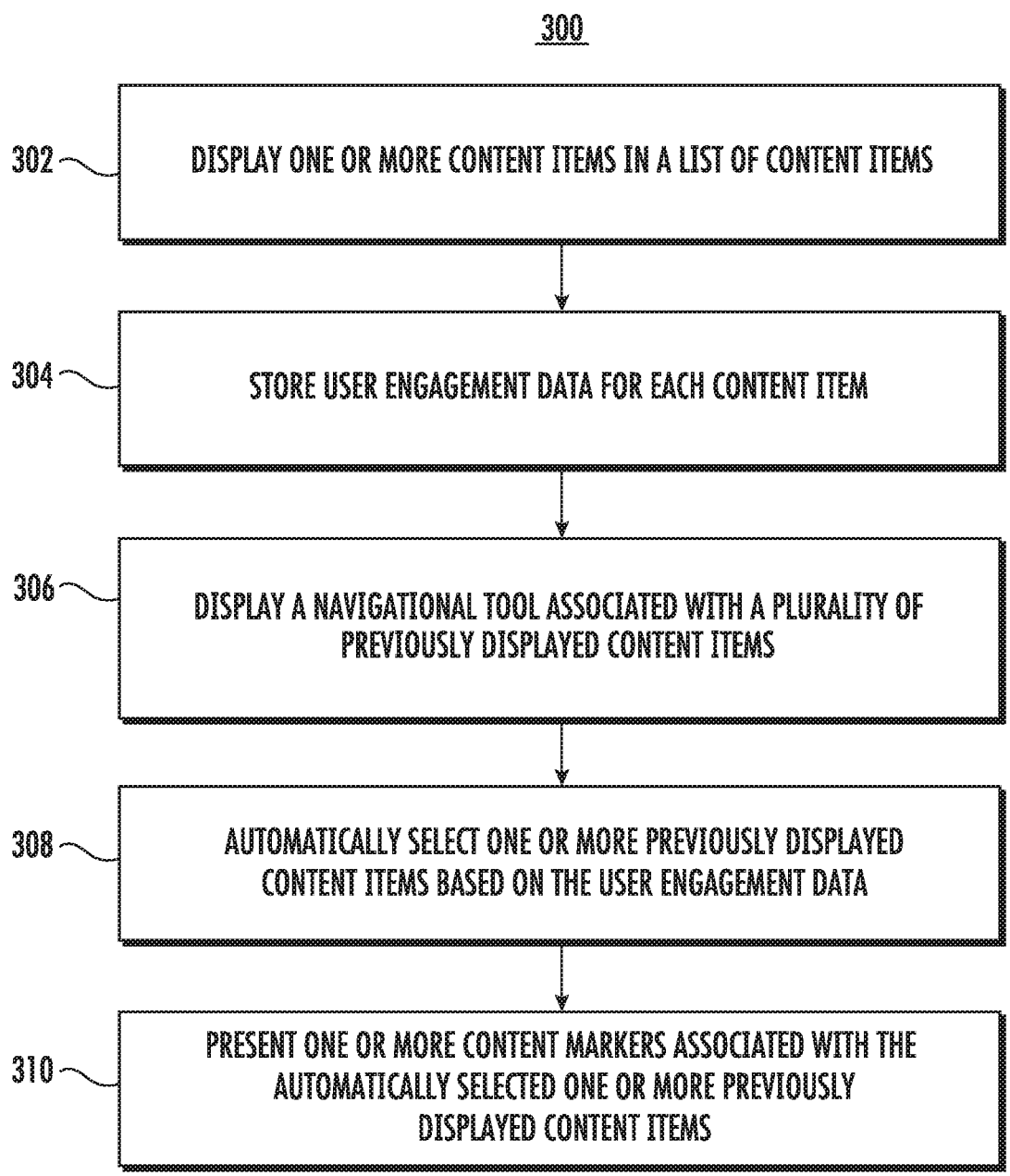
FIG. 3 depicts a flow chart of an example method for providing navigational tools in an infinite scroll presentation according to example embodiments of the present disclosure.

FIG. 3 depicts a flow chart of an example method (300) for providing more efficient navigation in an infinite scroll user interface according to an example embodiment of the present disclosure. Although method (300) will be discussed with reference to the user computing device 102 of FIG. 1, method (300) can be performed by any suitable computing system.

In addition, FIG. 3 depicts steps performed in a particular order for purposes of illustration and discussion. Those of ordinary skill in the art, using the disclosures provided herein, will understand that the various steps of method (300) can be omitted, adapted, and/or rearranged in various ways without departing from the scope of the present disclosure.

In some example embodiments, a computing device (e.g., user computing device 102 in FIG. 1) provides at (302), in a graphical user interface, at least a portion of a set of content items, the set of content items including a plurality of previously displayed content items that have previously been displayed and one or more currently displayed content items. For example, the computing device can present a plurality of content items in an infinite scroll user interface. A content item can include one or more of: an article, a video, a post, a status update, a piece of audio content, an interactive media object, and so on.

While providing one or more content items, the computing device can detect a first user control input. The first user control input can include any interaction with the computing device. For example, the first user control input can comprise a swiping action on a touch screen, a scrolling action on a mouse connected to a laptop or desktop computer, a spoken command to the computing device through a microphone, or any other control input that can be received by the computing device.

In response to detecting the first user control input, the computing device can remove one or more currently displayed content items from display in the graphical user interface and display one or more content items that were not previously displayed. For example, if the computing device receives a swipe action that causes the content items to scroll, currently displayed content items will move in a first direction until they reach the edge of the display area after which they will move out of the display area and no longer be visible.

In some embodiments, the computing device receives a second user control input. In some examples, the second user control input can be similar to the first user control input but have an opposite direction. Thus, if the first user control input is a swipe upwards, the second user control input can be a swipe downwards. In response to detecting the second user control input, the computing device can remove one or more currently displayed content items from display in the graphical user interface and display one or more previously displayed content items. Thus, if the first control user input acts to scroll content items in a first direction to show new content items, the second control user input can cause the content items to scroll in a second direction (different from the first direction) and cause previously displayed content items to be displayed again.

At (304) the computing device can store user engagement data for each content item in the plurality of previously displayed content items. In some example embodiments, the user engagement data for each content item in the plurality of previously displayed content items measures one or more of: viewing time, content item selection, sharing actions, and liking actions. Thus, as a user interacts with one or more content items, the computing device can track and record data associated with a user's engagement with the content item.

The computing device displays at (306) a navigational tool that enables the user to access the plurality of previously displayed content items. In some example embodiments, the navigational tool is a vertical scroll bar. In some cases, the navigational tool is displayed in response to a second user control input. In this case, the navigational tool is displayed when the user begins to scroll backward to view previously displayed content items.

In some example embodiments, one or more characteristics of the navigational tool can be based, at least in part, on the second user control input. For example, the speed of the second user control input (e.g., a scrolling action) can determine how much browsing history is represented by the navigational tool. Thus, the faster a user scrolls, the larger portion of the browsing history is represented by the navigational tool.

The computing device automatically can select at (308) one or more previously displayed content items from the plurality of previously displayed content items based on the user engagement data for at least one of the previously displayed content items in the plurality of previously displayed content items. In some example embodiments, the computing device automatically selects content items by generating a user engagement score for each respective content item in the set of content items based on the user engagement data for the respective content item. The computing system can automatically select the one or more previously displayed content items based on the generated user engagement score.

In some example embodiments, the computing device generates one or more content markers for the one or more automatically selected content items. In another example embodiment, the computing device can generate a plurality of content markers, each content marker associated with a specific time period and the respective content items displayed at that time period.

The computing device can present, at (310), in the graphical user interface and in association with the navigational tool, one or more content markers associated with the automatically selected one or more previously displayed content items. Each of the one or more content markers can include a representation of the one or more previously displayed content items with which it is associated. The representation can include a snippet of text or a thumbnail of an image (or a portion of the image itself).

In some example embodiments, each respective content marker of the one or more content markers is presented at a respective location along the navigational tool based on a respective position of the respective content item associated with the respective content marker in the plurality of previously viewed content items. In another example embodiment, the one or more content markers are presented at locations along the navigational tool that are non-linear with respect to a respective elapsed time since viewing the corresponding previously displayed content items.

In some example embodiments, the computing device detects a user input that indicates user selection of a first content marker of the of one or more content markers. For example, the user input can be tapping on a touch screen or clicking with a mouse. In response to detecting the user input that indicates user selection of the first content marker, the computing device updates the graphical user interface to display the one or more previously displayed content items associated with the first content marker.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIG. 3 respectively depict steps performed in a particular order for purposes of illustration and discussion, the methods of the present disclosure are not limited to the particularly illustrated order or arrangement. The various steps of the method shown in FIG. 3 can be omitted, rearranged, combined, and/or adapted in various ways without deviating from the scope of the present disclosure.

What is claimed is:

1. A computer-implemented method comprising:
providing, by one or more computing devices, in a graphical user interface, at least a portion of a set of content items, the set of content items including a plurality of previously displayed content items that have previously been displayed and one or more currently displayed content items;
storing, by the one or more computing devices, user engagement data for each content item in the plurality of previously displayed content items;
displaying, by the one or more computing devices, in the graphical user interface, a navigational tool that enables a user to access the plurality of previously displayed content items;
generating, by the one or more computing devices, a user engagement score for each respective content item in the plurality of previously displayed content items based on the user engagement data for the respective content item;
automatically selecting, by the one or more computing devices, one or more previously displayed content items based on the generated user engagement score;
generating, by the one or more computing devices, one or more content markers for the one or more automatically selected content items; and
presenting, by the one or more computing devices, in the graphical user interface and in association with the navigational tool, the one or more content markers associated with the automatically selected one or more previously displayed content items.

2. The computer-implemented method of claim 1, further comprising:
detecting, by the one or more computing devices, a user input that indicates user selection of a first content marker of the one or more content markers; and
in response to detecting the user input that indicates user selection of the first content marker; updating, by the one or more computing devices, the graphical user interface to display the one or more previously displayed content items associated with the first content marker.

3. The computer-implemented method of claim 1, wherein the user engagement data for each content item in the plurality of previously displayed content items measures one or more of: viewing time, content item selection, sharing actions, and liking actions.

4. The computer-implemented method of claim 1, wherein each of the one or more content markers includes a representation of the one or more previously displayed content items with which it is associated.

5. The computer-implemented method of claim 4, wherein the representation comprises a snippet of text from the one or more previously displayed content items.

6. The computer-implemented method of claim 4, wherein the representation comprises an image or thumbnail of the image included in the one or more previously displayed content item.

7. The computer-implemented method of claim 1, wherein the navigational tool is a vertical scroll bar.

8. The computer-implemented method of claim 7, wherein the content markers are arranged on or near the navigational tool in an order in which their respective associated content items were previously displayed.

9. The computer-implemented method of claim 1, the method further comprising:
detecting, by the one or more computing devices, a first user control input,
in response to detecting the first user control input:
removing, by the one or more computing devices, one or more currently displayed content items from display in the graphical user interface, and
displaying, in the graphical user interface, one or more content items that were not previously displayed.

10. The computer-implemented method of claim 1, wherein prior to displaying the one or more content markers, the method further comprises:
generating, by the one or more computing devices, a plurality of content markers, each content marker associated with a specific time period and the respective previously displayed content items displayed at that time period.

11. The computer-implemented method of claim 1, wherein the navigational tool is displayed in response to a second user control input.

12. The computer-implemented method of claim 11, wherein the second user control input is a scrolling action.

13. The computer-implemented method of claim 11, wherein one or more characteristics of the navigational tool are based, at least in part, on the second user control input.

14. The computer-implemented method of claim 11, further comprising, in response to detecting the second user control input:
removing, by the one or more computing devices, one or more currently displayed content items from display in the graphical user interface, and
displaying, by the one or more computing devices, in the graphical user interface, one or more previously displayed content items.

15. The computer-implemented method of claim 1, wherein each respective content marker of the one or more content markers is presented at a respective location along the navigational tool based on a respective position of the respective previously displayed content item associated with the respective content marker in the plurality of previously displayed content items.

16. The computer-implemented method of claim 1, wherein the one or more content markers are presented at locations along the navigational tool that are non-linear with respect to a respective elapsed time since viewing the corresponding previously displayed content items.

17. A device comprising:
a processor;
a display, and
a memory that stores instructions that, when executed by the processor, cause the device to perform operations, the operations comprising:
providing in a graphical user interface, at least a portion of a set of content items, the set of content items including a plurality of previously displayed content items that have previously been displayed and one or more currently displayed content items;
storing user engagement data for each content item in the plurality of previously displayed content items;
displaying in the graphical user interface, a navigational tool that enables a user to access the plurality of previously displayed content items;
generating a user engagement score for each respective content item in the plurality of previously displayed content items based on the user engagement data for the respective content item;
automatically selecting one or more previously displayed content items based on the generated user engagement score;
generating one or more content markers for the one or more automatically selected content items; and
presenting in the graphical user interface and in association with the navigational tool, the one or more content markers associated with the automatically selected one or more previously displayed content items.

18. The device of claim 17, wherein the operations further comprising:
detecting a user input that indicates user selection of a first content marker of the one or more content markers; and
in response to detecting the user input that indicates user selection of the first content marker; updating the graphical user interface to display the one or more previously displayed content items associated with the first content marker.

19. A non-transitory computer-readable medium storing instructions that, when executed by one or more computing devices, cause the one or more computing devices to perform operations, the operations comprising:
providing in a graphical user interface, at least a portion of a set of content items, the set of content items including a plurality of previously displayed content items that have previously been displayed and one or more currently displayed content items;
storing user engagement data for each content item in the plurality of previously displayed content items;
displaying in the graphical user interface, a navigational tool that enables a user to access the plurality of previously displayed content items;
generating a user engagement score for each respective content item in the plurality of previously displayed content items based on the user engagement data for the respective content item;
automatically selecting one or more previously displayed content items based on the generated user engagement score;
generating one or more content markers for the one or more automatically selected content items; and presenting in the graphical user interface and in association with the navigational tool, the one or more content markers associated with the automatically selected one or more previously displayed content items.

\* \* \* \* \*